No. 760,171. PATENTED MAY 17, 1904.
F. W. ATWELL.
HARNESS ATTACHMENT.
APPLICATION FILED NOV. 16, 1903.
NO MODEL.
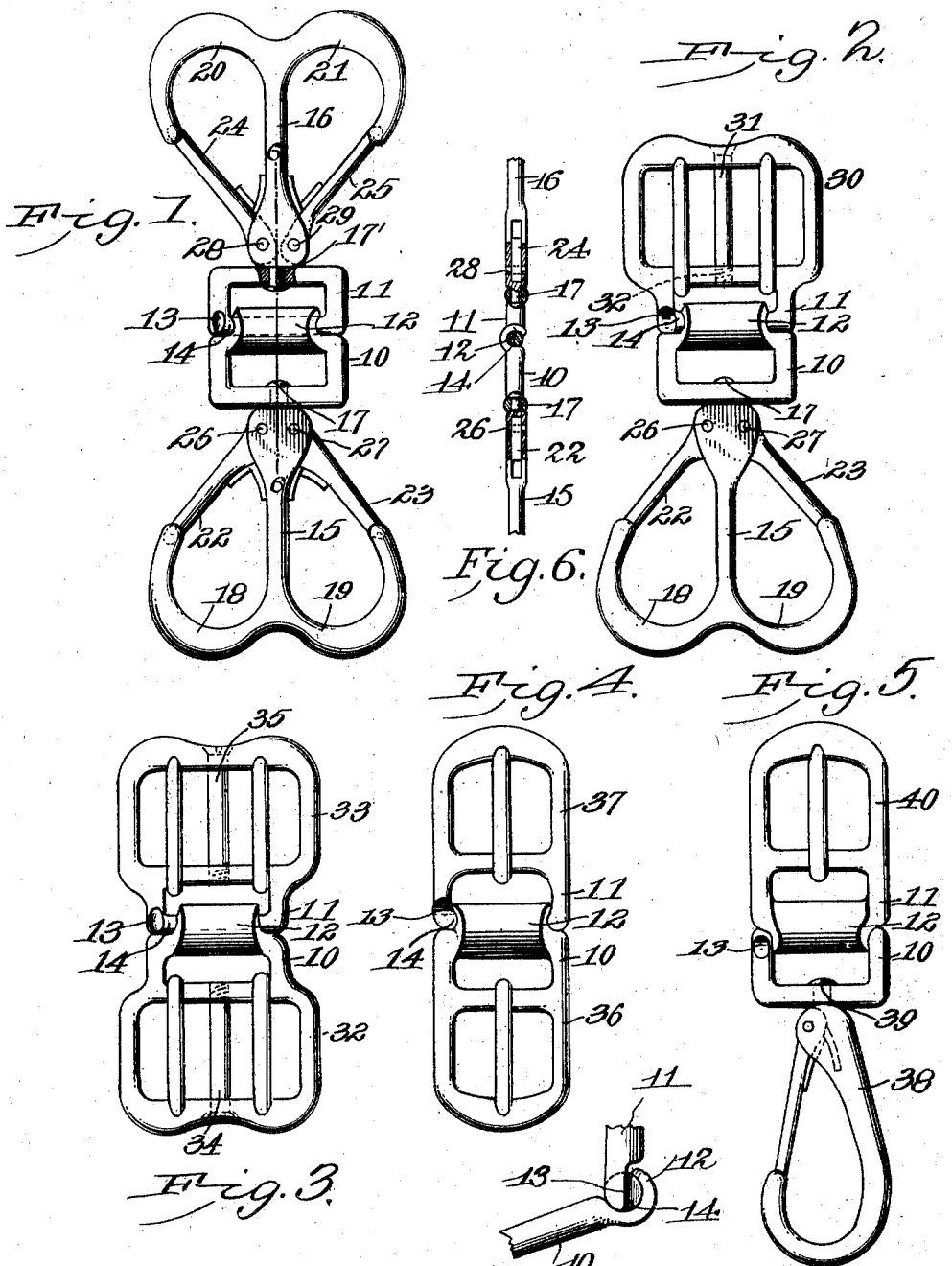
Witnesses
E. F. Stewart
C. H. Woodward.
Fred W. Atwell, Inventor
by C. A. Snow & Co
Attorneys No. 760,171.

Patented May 17, 1904.

UNITED STATES PATENT OFFICE.

FREDERICK W. ATWELL, OF EAST FOXLAKE, ILLINOIS.

HARNESS ATTACHMENT.

SPECIFICATION forming part of Letters Patent No. 760,171, dated May 17, 1904

Application filed November 16, 1903. Serial No. 181,379. (No model.)

*To all whom it may concern:*

Be it known that I, FREDERICK W. ATWELL, a citizen of the United States, residing at East Foxlake, in the county of Lake and State of Illinois, have invented a new and useful Harness Attachment, of which the following is a specification.

This invention relates to attachments to harness and analogous structures, and has for its object to produce a simply constructed and easily applied and operated device by which two straps may be detachably and adjustably united; and the invention consists in certain novel features of construction, as hereinafter shown and described, and specified in the claim.

In the drawings the device is represented in various modified forms, but all possessing the same general features of construction and operating in substantially the same manner to produce the same results.

Figure 1 represents the improved device associated with two oppositely-disposed double harness-snaps, and Fig. 2 represents the same associated with a double harness-snap on one side and a double buckle on the other side. Fig. 3 represents the improved device associated with two double buckles. Fig. 4 represents the improved device associated with two single buckles. Fig. 5 represents the improved device associated with a single buckle on one side and a single harness-snap on the other side. Fig. 6 is a sectional view taken on the line 6 6 in Fig. 1. Fig. 7 is a detail side view showing the rectangular frame portions folded in the direction of each other.

The improved device consists of two rectangular frames, represented, respectively, as a whole at 10 and 11, the frame 10 having a hook 12 upon one of its end bars and the frame 11 having a reduced portion 13 in one of its side bars next its inner end bar 14, as shown, to provide for the insertion of the same into the hook 12 when the two frames are placed in an unusual position.

In the construction shown in Fig. 1 harness snap-hook shanks 15 16 are swiveled, respectively, as at 17 17', to the outer end bars of the member 10 and 11, as shown, the shanks terminating in oppositely-extending hooks 18 19 20 21 and provided with spring-controlled tongues 22 23 24 25, pivoted, as at 26, 27, 28, and 29, to the shanks near their swiveled ends and held in yieldable engagement with the terminals of the hooks 18, 19, 20, and 21, as shown.

In the construction shown in Fig. 2 a double buckle, represented as a whole at 30, is substituted for one of the double harness-snaps, the buckle-frame being preferably integral with the frame 11 and with a central strengthening-rod 31, connected by its screw-threaded end 32 in the outer end bar of the member 11, as shown.

In the construction shown in Fig. 3 the double harness-snaps are replaced by two double buckles, as at 32 33, integral, respectively, with the members 10 11 and with threaded rods 34 35, disposed in the same manner as in Fig. 2.

In Fig. 4 the double harness-snaps are replaced by two single buckles 36 37, the frames of which are integral with the members 10 11, and in the construction shown in Fig. 5 the double harness-snaps are replaced by a single harness-snap 38, swiveled, as at 39, to the outer end bar of the member 10, and a single buckle 40, extending from the member 11, as shown.

By these simple arrangements of parts a very convenient and useful attachment is produced, which may be employed to advantage at several points on harness and similar structures and by which two straps may be quickly and adjustably connected and which will be held in position to be independently rotated by their swivel connections 16 17 and at the same time flexibly united by the link connection 12 14, as will be obvious.

It will be noted that by this arrangement of parts the members 10 11 may be disconnected when required by turning the two members into an unusual position or until the reduced portion 13 on one frame is opposite the point of the hook 12 of the other frame; but as the frames cannot get into releasable position while in use the frames will never become accidentally disconnected. The improved device thus provides for the flexibility of the connecting means in all directions and will effectually prevent the entangling or entwisting of the straps or other parts connected thereby.

The device may be constructed in any desired size or strength and of any required material.

The metal parts may be plated, japanned, or otherwise ornamented or protected, and may be modified in minor particulars without departing from the principle of the invention or sacrificing any of its advantages.

Having thus described the invention, what I claim is—

A device of the class described comprising two approximately rectangular frames the inner adjacent bars of said frames being provided, respectively, with a reduced portion and with a hook, the point of the hook of the one frame-bar being in alinement with the reduced portion of the other frame-bar only when the frames are folded in the direction of each other, said frames being capable of being connected or separated only when thus folded, the outer frame-bar of each frame being provided with strap-connecting members.

In testimony that I claim the foregoing as my own I have hereto affixed my signature in the presence of two witnesses.

FRED. W. ATWELL.

Witnesses:
HENRY G. ATWELL,
WALTER ATWELL.